US012709568B2

(12) United States Patent
Fu et al.

(10) Patent No.: US 12,709,568 B2
(45) Date of Patent: Aug. 18, 2026

(54) TRANSPARENT COMBEITE GLASS-CERAMICS

(71) Applicant: CORNING INCORPORATED, Corning, NY (US)

(72) Inventors: Qiang Fu, Painted Post, NY (US); Mitchell Bruce Haller, Horseheads, NY (US); Martha Rose Jesuit, Clarence, IA (US); Adam Thomas Shearer, Horseheads, NY (US); Liying Zhang, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 646 days.

(21) Appl. No.: 18/111,717

(22) Filed: Feb. 20, 2023

(65) Prior Publication Data

US 2023/0265007 A1 Aug. 24, 2023

Related U.S. Application Data

(60) Provisional application No. 63/313,397, filed on Feb. 24, 2022.

(51) Int. Cl.
*C03C 10/00* (2006.01)
*C03B 32/02* (2006.01)

(52) U.S. Cl.
CPC .............. *C03C 10/00* (2013.01); *C03B 32/02* (2013.01); *C03C 2204/00* (2013.01)

(58) Field of Classification Search
CPC ..... C03C 10/00; C03C 2204/00; C03C 3/087; C03C 10/0018; C03C 10/0036; C03B 32/02
See application file for complete search history.

(56) References Cited

U.S. PATENT DOCUMENTS

| | | | |
|---|---|---|---|
| 9,809,488 | B2 | 11/2017 | Beall et al. |
| 10,273,183 | B2 | 4/2019 | Cooper et al. |
| 2005/0119105 | A1 | 6/2005 | Zimmer et al. |
| 2015/0065329 | A1 | 3/2015 | Cornejo et al. |

FOREIGN PATENT DOCUMENTS

| | | |
|---|---|---|
| WO | 2003059834 A1 | 7/2003 |

OTHER PUBLICATIONS

Beall et al., "Nanophase glass-ceramics", Journal of the American Ceramic Society, 1999, vol. 82(1), pp. 5-16.
Fu et al., "Nature-inspired design of strong, tough glass-ceramics", MRS Bulletin, 2017, vol. 42(3), pp. 220-225.

(Continued)

*Primary Examiner* — Cameron K Miller
(74) *Attorney, Agent, or Firm* — Travis B. Gasa

(57) ABSTRACT

A silicate-based composition includes, in mol. %: 35-65% $SiO_2$, 20-40% CaO, 10-30% $Na_2O$, 0-15% $TiO_2$, >0-15% $Al_2O_3$, 0-10% $P_2O_5$, 0-15% $ZrO_2$, and 0-3% $SnO_2$. A method of forming a silicate-based composition includes ceramming a silicate-based composition such that the ceramming is a cycle has a first portion and a second portion, with the first portion conducted at a first temperature for a first time and the second portion conducted at a second temperature for a second time.

26 Claims, 5 Drawing Sheets

(56) References Cited

OTHER PUBLICATIONS

Sahama et al., "Gotzenite and combeite, two new silicates from the Belgian Congo", Mineralogical Magazine and Journal of the Mineralogical Society, 1957, vol. 31(238), pp. 503-510.
Cabal, B., et al., "A New Biocompatible and Antibacterial Phosphate Free Glass-Ceramic for Medical Applications", Scientific Reports, vol. 4, No. 1, 2014, pp. 1-9.
European Patent Application No. 23157589.5, Extended European Search Report, dated Jun. 30, 2023; 13 pages; European Patent Office.
Karem Noris-Suárez, et al., "Osteoblastic cells biomineralized on bioactive glass and glass-ceramics of the SiO2.Na20.CaO.K20.MgO.P205 system modified with AI2O3 and B2O3", Journal of Ceramic Processing Research, vol. 11, No. 2, 2010, pp. 129-137.
Lopez-Esteban, et al., "Mechanical performance of a biocompatible biocide soda-lime glass-ceramic", Journal of the Mechanical Behavior of Biomedical Materials, vol. 34, 2014, pp. 302-312.
Luo, Z., et al., "Effects of Fluoride Content on Structure and Properties of Steel Slag Glass-Ceramics", Materials Chemistry and Physics, 122531, 2019, pp. 1-27.

TRANSPARENT COMBEITE GLASS-CERAMICS

CROSS-REFERENCE TO RELATED APPLICATIONS

This application claims the benefit of priority under 35 U.S.C. § 119 (e) of U.S. Provisional Application Ser. No. 63/313,397 filed on Feb. 24, 2022, the content of which is relied upon and incorporated herein by reference in its entirety.

FIELD

This disclosure relates to glass compositions and glass-ceramic articles, and more particularly to glass compositions and glass-ceramic articles having a major phase of combeite.

BACKGROUND

Glass-ceramic materials are useful for a broad number of applications such as cooktops and cooking utensils in modern kitchens, components in portable electronic devices (e.g., smart phones, tablets, etc.), and architectural materials. There is a need to create new materials that offer the best compromise of application-specific design needs, such as transparency, color, and mechanical properties. For example, cover glass for consumer electronics require materials having a combination of high transparency and high mechanical strength.

Combeite glass-ceramic materials, as a major crystalline phase in $Na_2O$—$CaO$—$SiO_2$ systems, may be used in biological applications due to its high strength and toughness. However, although opaque and translucent combeite glass-ceramics have been reported, it is challenging to achieve high transparency combeite materials in three-component glass-ceramic families with high crystallinity due to difficulties in obtaining a clear precursor glass and in controlling the crystallite size.

This disclosure presents glass-ceramic compositions with a major phase of combeite with improved optical and mechanical properties.

SUMMARY

In embodiments, a silicate-based composition, comprises, in mol. %: 35-65% $SiO_2$, 20-40% CaO, 10-30% $Na_2O$, 0-15% $TiO_2$, >0-15% $Al_2O_3$, 0-10% $P_2O_5$, 0-15% $ZrO_2$, and 0-3% $SnO_2$.

In aspects, which are combinable with any of the other aspects or embodiments, the composition comprises, in mol. %: 40-55% $SiO_2$, 25-40% CaO, and 10-25% $Na_2O$, 0.5-15% $Al_2O_3$. In aspects, which are combinable with any of the other aspects or embodiments, the composition comprises, in mol. %: 0.5-10% $Al_2O_3$. In aspects, which are combinable with any of the other aspects or embodiments, the composition comprises, in mol. %: >0-10% $TiO_2$. In aspects, which are combinable with any of the other aspects or embodiments, the composition comprises, in mol. %: >0-10% $ZrO_2$. In aspects, which are combinable with any of the other aspects or embodiments, the composition comprises, in mol. %: >0-5% $P_2O_5$. In aspects, which are combinable with any of the other aspects or embodiments, the composition comprises, in mol. %: >0-3% $SnO_2$. In aspects, which are combinable with any of the other aspects or embodiments, a totality of other oxides is, in mol. %, less than 1%.

In aspects, which are combinable with any of the other aspects or embodiments, the composition is a cerammed silicate-based composition. In aspects, which are combinable with any of the other aspects or embodiments, the cerammed silicate-based composition is configured for at least one of: fracture toughness ranging from 0.9-2.5 MPa·m$^{0.5}$, Young's modulus ranging from 90-200 GPa, or transparency exceeding 70%. In aspects, which are combinable with any of the other aspects or embodiments, the cerammed silicate-based composition comprises a major combeite crystallite phase. In aspects, which are combinable with any of the other aspects or embodiments, the major combeite crystallite phase has a crystal size in a range of 100-300 μm. In aspects, which are combinable with any of the other aspects or embodiments, the cerammed silicate-based composition comprises at least one minor phase including carnegieite, albite, nepheline, or combinations thereof.

In embodiments, a method of forming a silicate-based composition, comprises: ceramming a composition comprising: 35-65% $SiO_2$, 20-40% CaO, 10-30% $Na_2O$, 0-15% $TiO_2$, >0-15% $Al_2O_3$, 0-10% $P_2O_5$, 0-15% $ZrO_2$, and 0-3% $SnO_2$, wherein the ceramming is a cycle comprising a first portion and a second portion, wherein the first portion is conducted at a first temperature for a first time and the second portion is conducted at a second temperature for a second time.

In aspects, which are combinable with any of the other aspects or embodiments, the first portion is different from the second portion. In aspects, which are combinable with any of the other aspects or embodiments, the first portion is conducted at a first temperature in a range of 500-1200° C. for a first time in a range of 12-36 hrs. In aspects, which are combinable with any of the other aspects or embodiments, the second portion is conducted at a second temperature in a range of 500-1200° C. for a second time in a range of 30 sec-1 hr. In aspects, which are combinable with any of the other aspects or embodiments, the silicate-based composition is configured for at least one of: fracture toughness ranging from 0.9-2.5 MPa·m$^{0.5}$, Young's modulus ranging from 90-200 GPa, or transparency exceeding 70%. In aspects, which are combinable with any of the other aspects or embodiments, the silicate-based composition comprises a major combeite crystallite phase. In aspects, which are combinable with any of the other aspects or embodiments, the major combeite crystallite phase has a crystal size in a range of 100-300 μm.

BRIEF DESCRIPTION OF THE DRAWINGS

The disclosure will become more fully understood from the following detailed description, taken in conjunction with the accompanying figures, in which.

Figure 5:
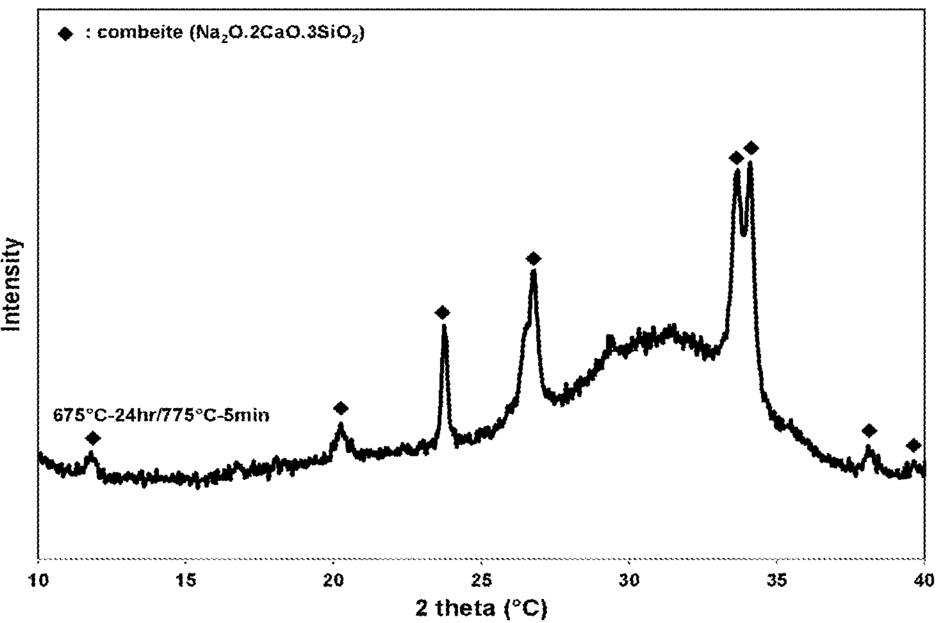

FIG. 5 illustrates a phase assemblage plot of Example 12 cerammed using an optimized cycle of 675° C.-24 hr/775° C.-5 min, according to some embodiments.

Figure 6A:
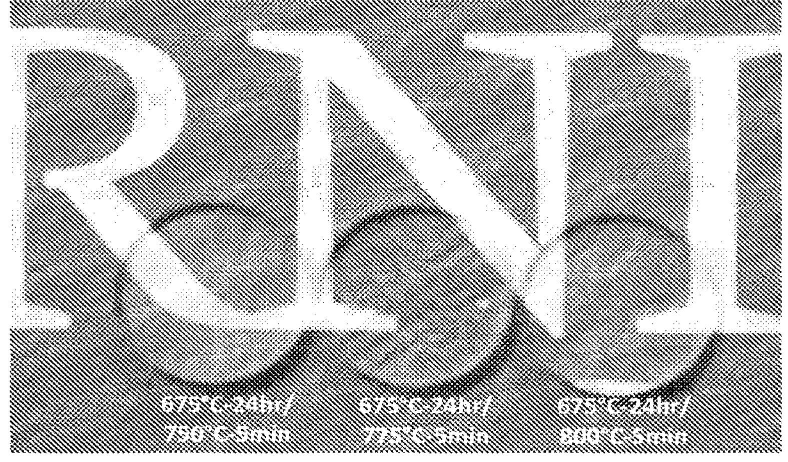
Figure 6B:
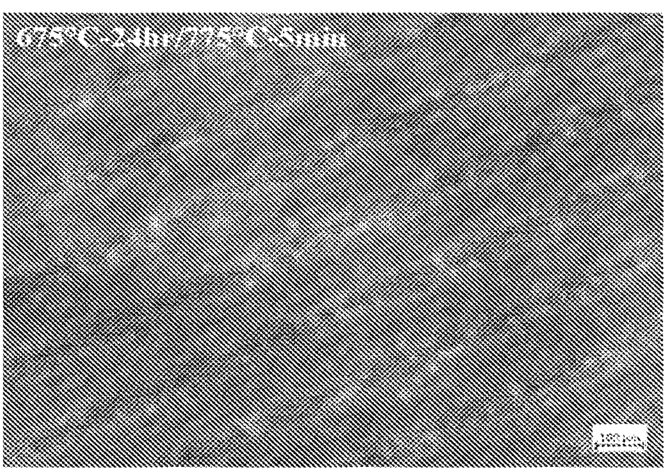

FIGS. 6A and 6B illustrate optical microscopy images of Example 12 cerammed using optimized cycles of 675° C.-24 hr/750° C.-5 min, 675° C.-24 hr/775° C.-5 min, and 675° C.-24 hr/800° C.-5 min, according to some embodiments. Images were taken on polished samples of 2.0 mm thick under a Leica microscope.

DETAILED DESCRIPTION

In the following description, whenever a group is described as comprising at least one of a group of elements and combinations thereof, it is understood that the group may comprise, consist essentially of, or consist of any number of those elements recited, either individually or in combination with each other. Similarly, whenever a group is described as consisting of at least one of a group of elements or combinations thereof, it is understood that the group may consist of any number of those elements recited, either individually or in combination with each other. Unless otherwise specified, a range of values, when recited, includes both the upper and lower limits of the range as well as any ranges therebetween.

Where a range of numerical values is recited herein, comprising upper and lower values, unless otherwise stated in specific circumstances, the range is intended to include the endpoints thereof, and all integers and fractions within the range. It is not intended that the scope of the claims be limited to the specific values recited when defining a range. Further, when an amount, concentration, or other value or parameter is given as a range, one or more preferred ranges or a list of upper preferable values and lower preferable values, this is to be understood as specifically disclosing all ranges formed from any pair of any upper range limit or preferred value and any lower range limit or preferred value, regardless of whether such pairs are separately disclosed. Finally, when the term "about" is used in describing a value or an end-point of a range, the disclosure should be understood to include the specific value or end-point referred to. When a numerical value or end-point of a range does not recite "about," the numerical value or end-point of a range is intended to include two embodiments: one modified by "about," and one not modified by "about."

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. It is noted that the terms "substantially" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue. Thus, for example, a glass or glass-ceramic that is "free" or "essentially free" of $Al_2O_3$ is one in which $Al_2O_3$ is not actively added or batched into the glass or glass-ceramic, but may be present in very small amounts as a contaminant (e.g., 500, 400, 300, 200, or 100 parts per million (ppm) or less or).

Herein, glass or glass-ceramic compositions are expressed in terms of mol. % amounts of particular components included therein on an oxide bases unless otherwise indicated. Any component having more than one oxidation state may be present in a glass or glass-ceramic composition in any oxidation state. However, concentrations of such component are expressed in terms of the oxide in which such component is at its lowest oxidation state unless otherwise indicated. As described herein, the term "glass" may comprise any glass, glass-ceramic, or ceramic composition or precursor thereof.

Glass/Glass-Ceramic Compositions

The present disclosure describes new glass compositions that can be cerammed to form transparent glass-ceramics with a major phase of combeite and minor phases of carnegieite, albite and nepheline. Combeite, a trigonal crystal, has a refractive index of 1.598 with zero birefringence, making it a desired phase for transparent glass-ceramics to achieve a combination of high crystallinity and high transparency. Presence of a combeite phase results in high fracture toughness and high modulus, which is desired for a variety of applications. This group of transparent glass-ceramics exhibit desired mechanical attributes including high fracture toughness and high modulus. Glass-ceramic articles composed of trigonal crystals may be produced by ceramming precursor glasses at low temperatures relative to crystallization temperatures. Viscosity and mechanical performance are also influenced by glass compositions.

In examples, the glass comprises a combination of $SiO_2$, CaO, and $Na_2O$. In examples, the glass further comprises $TiO_2$. In examples, the glass further comprises $Al_2O_3$. In examples, the glass further comprises $P_2O_5$. In examples, the glass further comprises $ZrO_2$.

For example, the glass may comprise a composition including, in mol. %: 35-65% $SiO_2$, 20-40% CaO, and 10-30% $Na_2O$. In examples, the glass further comprises, in mol. %: 0-15% $TiO_2$. In examples, the glass further comprises, in mol. %: 0-15% $Al_2O_3$. In examples, the glass further comprises, in mol. %: 0-10% $P_2O_5$. In examples, the glass further comprises, in mol. %: 0-15% $ZrO_2$.

In examples, the glass may comprise a composition including, in mol. %: 40-55% $SiO_2$, 25-40% CaO, and 10-25% $Na_2O$. In examples, the glass further comprises, in mol. %: >0-10% $TiO_2$. In examples, the glass further comprises, in mol. %: >0-10% $Al_2O_3$. In examples, the glass further comprises, in mol. %: 0-5% $P_2O_5$. In examples, the glass further comprises, in mol. %: >0-10% $ZrO_2$. The compositions disclosed herein are particularly suitable for cover glass applications in consumer electronics.

In the glass compositions described herein, silicon dioxide ($SiO_2$) serves as the primary glass-forming oxide for the precursor glasses of Table 1 and may function to provide high temperature stability and chemical durability of the networking glass and glass-ceramic structure. $SiO_2$ concentration should be sufficiently high to form the combeite crystal phase when the precursor glass is heat treated (i.e., cerammed) to convert the glass to a glass-ceramic. However, the glasses should not contain too much $SiO_2$ since melting temperatures (200 poise temperature) of pure $SiO_2$ or high-$SiO_2$ glasses would be undesirably high.

In examples, the glass can comprise 35-65 mol. % $SiO_2$. In examples, the glass can comprise 40-55 mol. % $SiO_2$. In examples, the glass can comprise 35-65 mol. %, or 40-65 mol. %, or 40-60 mol. %, or 40-55 mol. %, or 45-55 mol. % $SiO_2$, or any value or range disclosed therein. In examples, the glass comprises 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, or 65 mol. % $SiO_2$, or any value or range having endpoints disclosed herein.

In examples, the glass can comprise 20-40 mol. % CaO. In examples, the glass can comprise 25-40 mol. % CaO. In examples, the glass can comprise 20-40 mol. %, or 25-40 mol. %, or 30-40 mol. % CaO, or any value or range disclosed therein. In examples, the glass can comprise 20, 21, 22, 23, 24, 25, 26, 27, 28, 29, 30, 31, 32, 33, 34, 35, 36, 37, 38, 39, or 40 mol. % CaO, or any value or range having endpoints disclosed herein. In addition to its role as a flux (i.e., an oxide functioning as a network modifier to lower viscosity of a glass), CaO is another key oxide to enable the formation of the combeite phase.

In examples, the glass can comprise 10-30 mol. % $Na_2O$. In examples, the glass can comprise 10-25 mol. % $Na_2O$. In examples, the glass can comprise 10-30 mol. %, or 10-25 mol. %, or 10-20 mol. % $Na_2O$, or any value or range disclosed therein. In examples, the glass can comprise 10, 11, 12, 13, 14, 15, 16, 17, 18, 19, 20, 21, 22, 23, 24, 25, 26, 27, 28, 29, or 30 mol. % $Na_2O$, or any value or range having endpoints disclosed herein. Including $Na_2O$ in the disclosed ranges helps to reduce the melting temperature of the glass, as well as to shorten the ceramming cycle (discussed below). Furthermore, $Na_2O$ is a key component in forming the desired combeite phase in the glass-ceramic family.

Alumina may influence (i.e., stabilize) the network structure of the glass and improve mechanical properties, thermal and chemical durability, such as, for example, by preventing phase separation to obtain clear precursor glass. In examples, $Al_2O_3$ may lower liquidus temperature and coefficient of thermal expansion, or, enhance the strain point. In addition to its role as a network former, $Al_2O_3$ (and $ZrO_2$) help improve the chemical durability and mechanical properties in silicate glass while having no toxicity concerns. Too high a content of $Al_2O_3$ or $ZrO_2$ (e.g., >20 wt. %) generally increases the viscosity of the melt and decreases the efficiency of internal nucleation. Furthermore, glasses with high alumina content may become too stale to crystallize, which is not desired to produce a glass-ceramic. In examples, the glass can comprise 0.5-15 mol. % $ZrO_2$ and/or $Al_2O_3$. In examples, the glass can comprise from >0-10 mol. % $ZrO_2$ and/or $Al_2O_3$. In examples, the glass can comprise 0-15 mol. %, or >0-10 mol. %, or 0-5 mol. %, or 0-10 mol. %, or >0-5 mol. % $ZrO_2$ and/or $Al_2O_3$, or any value or range disclosed therein. In examples, the glass can comprise 0, >0, 1, 2, 3, 4, 5, 6, 7, 8, 9, 10, 11, 12, 13, 14, or 15 mol. % $ZrO_2$ and/or $Al_2O_3$, or any value or range having endpoints disclosed herein.

Zirconium dioxide ($ZrO_2$) may also be present and serves to function as a network former or intermediate in precursor glasses, as well as a key oxide for improving glass thermal stability in $Na_2O$—CaO—$SiO_2$ systems by significantly reducing glass devitrification during forming and lowering liquidus temperature. In aspects, $ZrO_2$ may play a similar role as alumina ($Al_2O_3$) in the composition.

In examples, the glass can comprise 0-15 mol. % $TiO_2$. In examples, the glass can comprise >0-10 mol. % $TiO_2$. In examples, the glass can comprise 0-15 mol. %, or >0-12 mol. %, or >0-10 mol. %, or >0-7 mol. % $TiO_2$, or any value or range disclosed therein. In examples, the glass can comprise 0, >0, 1, 2, 3, 4, 5, 6, 7, 8, 9, 10, 11, 12, 13, 14, or 15 mol. % $TiO_2$, or any value or range having endpoints disclosed herein.

Phosphorus pentoxide ($P_2O_5$) serves as a network former in addition to increasing viscosity of the glass, which in turn, expands the range of operating temperatures, and is therefore an advantage to the manufacture and formation of the glass. In examples, the glass can comprise 0-10 mol. % $P_2O_5$. In examples, the glass can comprise 0-5 mol. % $P_2O_5$. In examples, the glass can comprise 0-10 mol. %, or >0-10 mol. %, or 0-5 mol. %, or >0-5 mol. % $P_2O_5$, or any value or range disclosed therein. In examples, the glass can comprise 0, >0, 1, 2, 3, 4, 5, 6, 7, 8, 9, or 10 mol. % $P_2O_5$, or any value or range having endpoints disclosed herein.

Divalent cation oxides (such as alkaline earth oxides and ZnO) improve the melting behavior, chemical durability, and bioactivity of the glass. Particularly, CaO is found to be able to react with $P_2O_5$ to form apatite when immersed in a simulated body fluid (SBF) or in vivo. The release of $Ca^{2+}$ ions from the surface of the glass contributes to the formation of a layer rich in calcium phosphate. Thus, the combination of $P_2O_5$ and CaO may provide advantageous compositions for bioactive glasses. Alkaline earth oxides may improve other desirable properties in the materials, including influencing the Young's modulus and the coefficient of thermal expansion.

In examples, the glass can comprise other alkaline earth oxides (e.g., BeO, MgO, SrO, and/or BaO). In examples, the glass can comprise 0-20 mol. % BeO, MgO, SrO, BaO, or combinations thereof. In examples, the glass can comprise from 0-20 mol. %, or 0-10 mol. %, or >0-10 mol. % BeO, MgO, SrO, BaO, or combinations thereof, or any value or range disclosed therein. In examples, the glass can comprise 0, >0, 1, 2, 3, 4, 5, 6, 7, 8, 9, 10, 11, 12, 13, 14, 15, 16, 17, 18, 19, or 20 mol. % BeO, MgO, SrO, BaO, or combinations thereof, or any value or range having endpoints disclosed herein. The inclusion of MgO can improve liquidus of the precursor glass to avoid devitrification during forming. The inclusion of SrO can improve liquidus of the precursor glass to avoid devitrification during forming. Moreover, SrO can also enter apatite structures to improve bioactivity.

In examples, the glass can comprise ZnO. In examples, the glass can comprise 0-20 mol. % ZnO. In examples, the glass can comprise from 0-20 mol. %, or 0-10 mol. %, or >0-10 mol. % ZnO, or any value or range disclosed therein. In examples, the glass can comprise 0, >0, 1, 2, 3, 4, 5, 6, 7, 8, 9, 10, 11, 12, 13, 14, 15, 16, 17, 18, 19, or 20 mol. % ZnO, or any value or range having endpoints disclosed herein. The inclusion of ZnO can improve liquidus of the precursor glass to avoid devitrification during forming. Moreover, ZnO may also enter apatite structures to improve bioactivity.

Alkali oxides ($Na_2O$, $K_2O$, $Li_2O$, $Rb_2O$, or $Cs_2O$) serve as aids in achieving low melting temperature and low liquidus temperatures. Meanwhile, the addition of alkali oxides can improve bioactivity. In examples, addition of alkali oxides (outside of $Na_2O$) may be included at lower concentrations (e.g., less than 3 mol. %) without altering phase assemblage. In examples, the glass can comprise 10-45 mol. % $Na_2O$, $K_2O$, $Li_2O$, $Rb_2O$, $Cs_2O$, or combinations thereof. In examples, the glass can comprise from 10-45 mol. %, or 10-40 mol. %, or 15-40 mol. %, $Na_2O$, $K_2O$, $Li_2O$, $Rb_2O$, $Cs_2O$, or combinations thereof, or any value or range disclosed therein. In examples, the glass can comprise 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, or 45 mol. %, $Na_2O$, $K_2O$, $Li_2O$, $Rb_2O$, $Cs_2O$, or combinations thereof, or any value or range having endpoints disclosed herein.

In examples, the glass can comprise 0-5 mol. % $B_2O_3$. In examples, the glass can comprise >0-5 mol. % $B_2O_3$. In examples, the glass can comprise from 0-5 mol. %, or >0-5 mol. %, or 2-5 mol. % $B_2O_3$, or any value or range disclosed therein. In examples, the glass can comprise 0, >0, 1, 2, 3, 4, or 5 mol. % $B_2O_3$, or any value or range having endpoints disclosed herein.

Additional components can be incorporated into the glass to provide additional benefits or may be incorporated as contaminants typically found in commercially-prepared glass. For example, additional components can be added as coloring or fining agents (e.g., to facilitate removal of gaseous inclusions from melted batch materials used to produce the glass) and/or for other purposes. In the case of $SnO_2$, this component may be added as fining agent for better glass melting quality. In examples, the glass may comprise one or more compounds useful as ultraviolet radiation absorbers. In examples, the glass can comprise 3 mol. % or less ZnO, $TiO_2$, CeO, MnO, $Nb_2O_5$, $MoO_3$, $Ta_2O_5$, $WO_3$, $SnO_2$, $Fe_2O_3$, $As_2O_3$, $Sb_2O_3$, Cl, Br, or combinations thereof. In examples, the glass can comprise from 0 to about 3 mol. %, 0 to about 2 mol. %, 0 to about 1 mol. %, 0 to 0.5 mol. %, 0 to 0.1 mol. %, 0 to 0.05 mol. %, or 0 to 0.01 mol. % ZnO, $TiO_2$, CeO, MnO, $Nb_2O_5$, $MoO_3$, $Ta_2O_5$, $WO_3$, $SnO_2$, $Fe_2O_3$, $As_2O_3$, $Sb_2O_3$, Cl, Br, or combinations thereof. The glasses, according to examples, can also include various contaminants associated with batch materials and/or introduced into the glass by the melting, fining, and/or forming equipment used to produce the glass. For example, in embodiments, the glass can comprise from 0 to about 3 mol. %, 0 to about 2 mol. %, 0 to about 1 mol. %, 0 to about 0.5 mol. %, 0 to about 0.1 mol. %, 0 to about 0.05 mol. %, or 0 to about 0.01 mol. % $SnO_2$ or $Fe_2O_3$, or combinations thereof.

Various aspects are contemplated herein, several of which are set forth in the paragraphs below. It is explicitly contemplated that any aspect or portion thereof can be combined to form an aspect.

Aspect 1: A silicate-based composition, comprising, in mol. %:

35-65% $SiO_2$,
20-40% CaO,
10-30% $Na_2O$,
0-15% $TiO_2$,
>0-15% $Al_2O_3$,
0-10% $P_2O_5$,
0-15% $ZrO_2$, and
0-3% $SnO_2$.

Aspect 2: The composition of aspect 1, wherein the composition comprises, in mol. %:

40-55% $SiO_2$,
25-40% CaO,
10-25% $Na_2O$, and
0.5-15% $Al_2O_3$.

Aspect 3: The composition of aspect 1 or 2, or any preceding aspect, wherein the composition comprises, in mol. %:

0.5-10% $Al_2O_3$.

Aspect 4: The composition of any one of aspects 1-3, or any preceding aspect, wherein the composition comprises, in mol. %:

>0-10% $TiO_2$.

Aspect 5: The composition of any one of aspects 1-4, or any preceding aspect, wherein the composition comprises, in mol. %:

>0-10% $ZrO_2$.

Aspect 6: The composition of any one of aspects 1-5, or any preceding aspect, wherein the composition comprises, in mol. %:

>0-5% $P_2O_5$.

Aspect 7: The composition of any one of aspects 1-6, or any preceding aspect, wherein the composition comprises, in mol. %:

>0-3% $SnO_2$.

Aspect 8: The composition of any one of aspects 1-7, or any preceding aspect, wherein a totality of other oxides is, in mol. %, less than 1%.

Aspect 9: The composition of any one of aspects 1-8, or any preceding aspect, wherein the composition is a cerammed silicate-based composition.

Aspect 10: The composition of aspect 9, or any preceding aspect, wherein the cerammed silicate-based composition has at least one of:

fracture toughness ranging from 0.9-2.5 $MPa{\cdot}m^{0.5}$,
Young's modulus ranging from 90-200 GPa, or
transparency exceeding 70%.

Aspect 11: The composition of aspect 9 or 10, or any preceding aspect, wherein the cerammed silicate-based composition comprises a major combeite crystallite phase.

Aspect 12: The composition of aspect 11, or any preceding aspect, wherein the major combeite crystallite phase has a crystal size in a range of 100-300 μm.

Aspect 13: The composition of any one of aspects 9-12, or any preceding aspect, wherein the cerammed silicate-based composition comprises at least one minor phase including carnegieite, albite, nepheline, or combinations thereof.

Aspect 14: A method of forming a cerammed silicate-based composition, comprising:

ceramming a silicate-based composition comprising:

35-65% $SiO_2$,
20-40% CaO,
10-30% $Na_2O$,
0-15% $TiO_2$,
>0-15% $Al_2O_3$,
0-10% $P_2O_5$,
0-15% $ZrO_2$, and
0-3% $SnO_2$ wherein the ceramming is a cycle comprising a first portion and a second portion, wherein the first portion is conducted at a first temperature for a first time and the second portion is conducted at a second temperature for a second time.

Aspect 15: The method of aspect 14, or any preceding aspect, wherein the first portion is different from the second portion.

Aspect 16: The method of aspect 14 or 15, or any preceding aspect, wherein the first portion is conducted at a first temperature in a range of 500-1200° C. for a first time in a range of 12-36 hrs.

Aspect 17: The method of any one of aspects 14-16, or any preceding aspect, wherein the second portion is conducted at a second temperature in a range of 500-1200° C. for a second time in a range of 30 sec-1 hr.

Aspect 18: The method any one of aspects 14-17, or any preceding aspect, wherein the cerammed silicate-based composition has at least one of:

fracture toughness ranging from 0.9-2.5 $MPa{\cdot}m^{0.5}$
Young's modulus ranging from 90-200 GPa, or
transparency exceeding 70%.

Aspect 19: The method any one of aspects 14-18, or any preceding aspect, wherein the cerammed silicate-based composition comprises a major combeite crystallite phase.

Aspect 20: The method aspect 19, or any preceding aspect, wherein the major combeite crystallite phase has a crystal size in a range of 100-300 μm.

Examples

The embodiments described herein will be further clarified by the following examples.

Compositions and Characterization

Non-limiting examples of amounts of precursor oxides for forming the embodied glasses are listed in Table 1, along with the properties of the resulting glasses in Table 2. The annealing point (° C.) may be measured using a beam bending viscometer (ASTM C598-93); the density (g/cm$^3$) may be measured using a water displacement method (ASTM D792-20); the refractive index using a Metricon 2010 Prism Coupler on polished specimens (ASTM C1648-12).

TABLE 1

| Oxide (mol. %) | 1 | 2 | 3 | 4 | 5 | 6 | 7 | 8 | 9 | 10 | 11 | 12 |
|---|---|---|---|---|---|---|---|---|---|---|---|---|
| $SiO_2$ | 50.0 | 49.0 | 49.0 | 48.0 | 47.1 | 45.4 | 48.0 | 47.1 | 46.2 | 47.6 | 47.1 | 49.0 |
| $Al_2O_3$ | 0.0 | 0.0 | 0.0 | 2.0 | 3.8 | 7.4 | 2.0 | 1.9 | 1.9 | 1.9 | 1.9 | 2.0 |
| $Na_2O$ | 16.7 | 16.3 | 16.3 | 16.0 | 15.7 | 15.1 | 16.0 | 15.7 | 15.4 | 15.8 | 15.7 | 16.3 |
| CaO | 33.3 | 32.7 | 32.7 | 32.1 | 31.4 | 30.3 | 32.1 | 31.4 | 30.9 | 31.8 | 31.4 | 32.7 |
| $P_2O_5$ | 0.0 | 2.0 | 0.0 | 0.0 | 0.0 | 0.0 | 0.0 | 0.0 | 0.0 | 0.0 | 0.0 | 0.0 |
| $TiO_2$ | 0.0 | 0.0 | 2.0 | 2.0 | 1.9 | 1.9 | 2.0 | 3.8 | 5.7 | 1.9 | 1.9 | 0.0 |
| $ZrO_2$ | 0.0 | 0.0 | 0.0 | 0.0 | 0.0 | 0.0 | 0.0 | 0.0 | 0.0 | 1.0 | 1.9 | 0.0 |

TABLE 2

| Example | 1 | 2 | 3 | 4 | 5 | 6 | 7 | 8 | 9 | 10 | 11 | 12 |
|---|---|---|---|---|---|---|---|---|---|---|---|---|
| Appearance | White opaque | Surface devit* | White opaque | Clear transparent | | | | | | | | |
| Density at 20° C. (g/cm$^3$) | 2.76 | 2.78 | 2.80 | 2.79 | 2.77 | 2.77 | 2.79 | 2.82 | 2.85 | 2.82 | 2.85 | 2.75 |
| Annealing Point (° C.) | 563 | 586 | 580 | 580 | 587 | 593 | 580 | 579 | 580 | 591 | 602 | 587 |
| Refractive Index, $n_d$ | 1.584 | 1.579 | 1.598 | 1.596 | 1.593 | 1.595 | 1.596 | 1.608 | 1.621 | 1.601 | 1.607 | 1.582 |

The present disclosure presents new compositions (Table 1) that can be cerammed to produce transparent glass-ceramics with a major phase of combeite, and minor phases of carnegieite, albite and nepheline.

Figure 1:
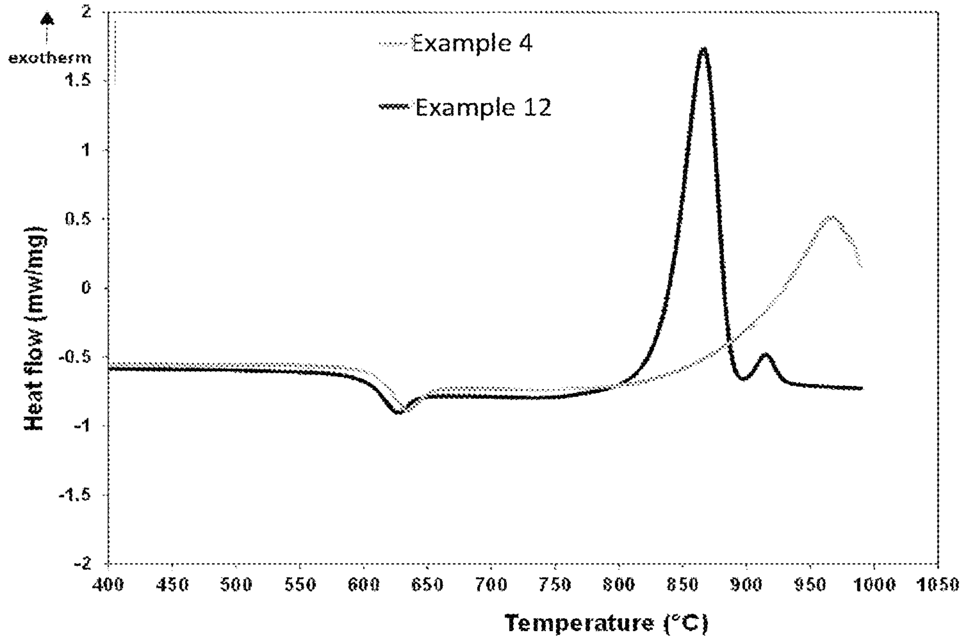
FIG. 1 illustrates differential scanning calorimetry (DSC) measurements of Example 4 and Example 12, according to some embodiments.

The formed transparent glass-ceramics exhibit desired mechanical attributes such as high fracture toughness and high modulus. Glass-ceramic articles composed of trigonal crystals are produced by ceramming precursor glasses at low temperatures relative to crystallization temperatures, as determined by differential scanning calorimetry. For example, FIG. 1 illustrates DSC measurements of Example 4 and Example 12. DSC was used to determine the thermal events of the glass upon heating to high temperatures. Cylindrical discs (6 mm in diameter×0.5 mm in thickness) were used for thermal analysis using a Netzsch DSC 404 F1 Pegasus instrument. Discs were contained in a platinum cup and heated to 1000° C. at 10° C./min. The presence of a pronounced exothermic crystallization peak is observed in both compositions. The addition of $TiO_2$ in Example 4 increases the crystallization temperature versus the $TiO_2$-free composition (Example 12).

The precursor glass (e.g., Examples 1-12) for glass-ceramics can be in the form of, for example, particles, powder, microspheres, fibers, sheets, beads, scaffolds, woven fibers, or other form depending on the application. The compositions of Table 1 may be melted at temperatures below 1500° C. (e.g., below 1300° C.) and/or temperatures above 750° C. (e.g., above 1000° C.), thereby making it possible to melt in a relatively small commercial glass tanks. The glass can be easily formed using traditional glass forming techniques, such as rolling, molding, and float processes.

To form glass-ceramic articles disclosed herein, the glasses of Table 1 are positioned in a crystallization kiln to undergo crystallization processing. Glass-ceramic articles with high crystallinity (e.g., >50%) are obtained by ceramming precursor glasses at temperatures ranging from 500° C. to 1200° C. for predetermined amount of time (e.g., 0.1-48 hrs (e.g., 24 hrs), or 0.5-3 hrs (e.g., 2 hrs)).

In examples, ceramming temperatures may range from 500-1200° C., or 500-1000° C., or 500-800° C., or 650-1200° C., or 850-1200° C., or 1000-1200° C., or any value or range disclosed therein. In examples, ceramming temperatures can comprise 500° C., or 525° C., or 550° C., or 575° C., or 600° C., or 625° C., or 650° C., or 675° C., or 700° C., or 725° C., or 750° C., or 775° C., or 800° C., or 825° C., or 850° C., or 875° C., or 900° C., or 925° C., or 950° C., or 975° C., or 1000° C., or 1025° C., or 1050° C., or 1075° C., or 1100° C., or 1125° C., or 1150° C., or 1175° C., or 1200° C., or any value or range having endpoints disclosed herein.

In examples, ceramming times may range from 0.1-48 hrs, or 1-36 hrs, or 1-24 hrs, or 12-36 hrs, or 24-48 hrs, or 1-12 hrs, or 12-24 hrs, or 24-36 hrs, or 36-48 hrs, or 0.1-6 hrs, or 1-36 hrs, or 1-36 hrs, or 1-36 hrs, or 1-36 hrs, or 1-36 hrs, or 30 sec-1 hr, or 30 sec-45 min, or 1-30 min, or 1-20 min, or 1-15 min, or 1-10 min, or 1-5 min, or 2-8 min, or 2-7 min, or any value or range disclosed therein. In examples, ceramming times can comprise 10 sec, or 20 sec, or 30 sec, or 45 sec, or 1 min, or 2 min, or 3 min, or 4 min, or 5 min, or 6 min, or 7 min, or 8 min, or 9 min, or 10 min, or 15 min, or 20 min, or 30 min, or 45 min, or 1 hr, or 2 hrs, or 5 hrs, or 10 hrs, or 15 hrs, or 20 hrs, or 25 hrs, or 30 hrs, or 35 hrs, or 40 hrs, or 45 hrs, or 50 hrs, or any value or range having endpoints disclosed herein.

In embodiments, ceramming schedule may comprise one, or at least two, or otherwise multiple sets of ceramming temperatures and times, each selected independently.

Figure 2A:
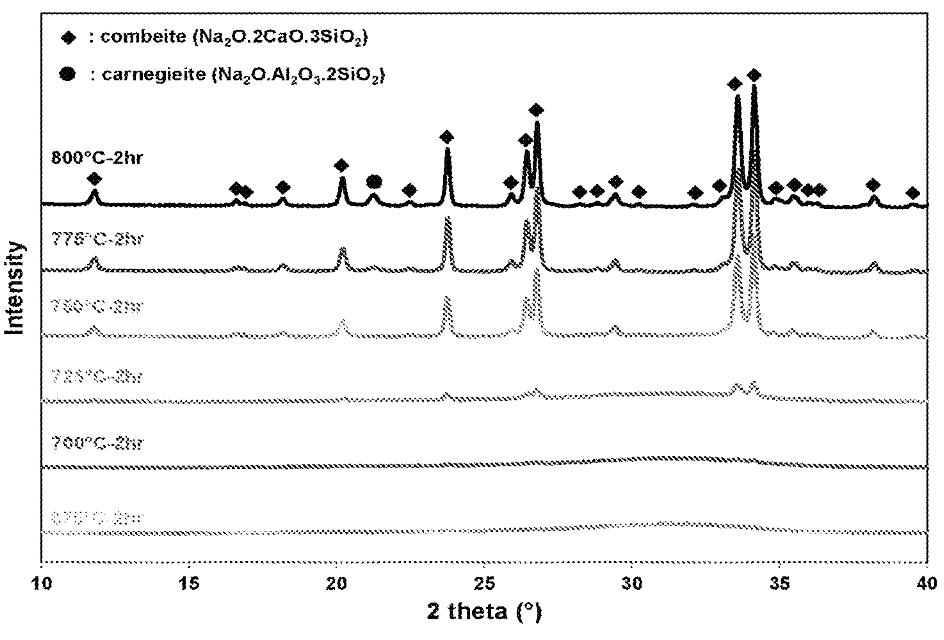
FIGS. 2A and 2B illustrate phase evolution of Example 4 (FIG. 2A) and Example 12 (FIG. 2B), according to some embodiments.
Figure 2B:
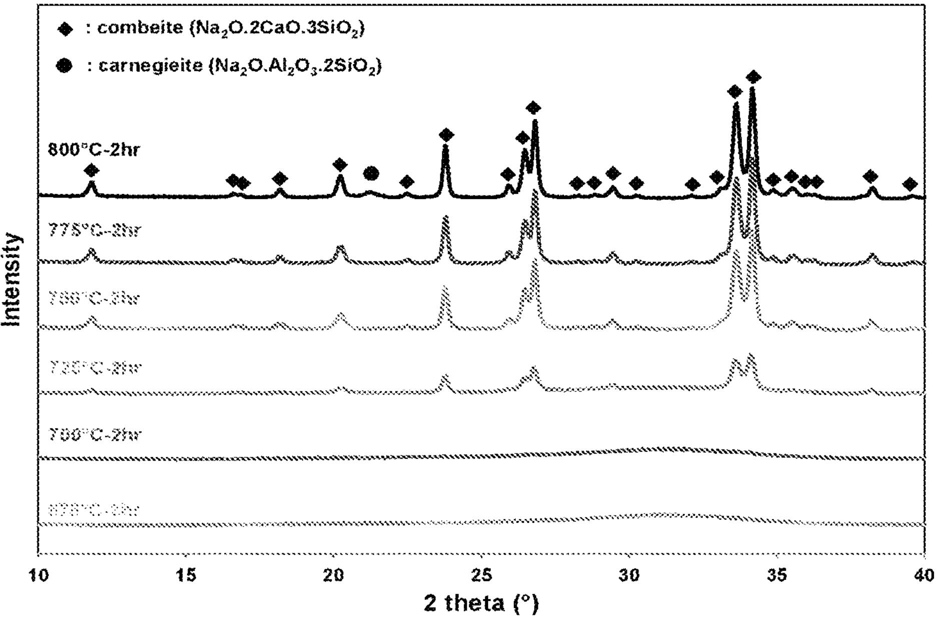

After forming into desired shapes, the precursor glass may be cerammed to produce the desired phase assemblage by thermally treating them at elevated temperatures. In other words, the glass may be formed using a melt process and then cerammed at the same or different conditions as the melt process. FIGS. 2A and 2B illustrate phase evolution of Example 4 (FIG. 2A) and Example 12 (FIG. 2B) as ceramming temperature increases. The heat-treated specimens were analyzed using x-ray diffraction (XRD) to determine the crystalline phases present. The samples were prepared for XRD analysis by grinding to a fine powder using a Rocklabs ring mill. The powder was then analyzed using a Bruker D4 Endeavor equipped with a LynxEye™ silicon strip detector. X-ray scanning was conducted from 5° to 80° (2θ) for data collection. In both Examples 4 and 12, the major crystallite phase is combeite. The minor phase may include carnegieite, albite, nepheline, or combinations thereof.

Figure 3A:
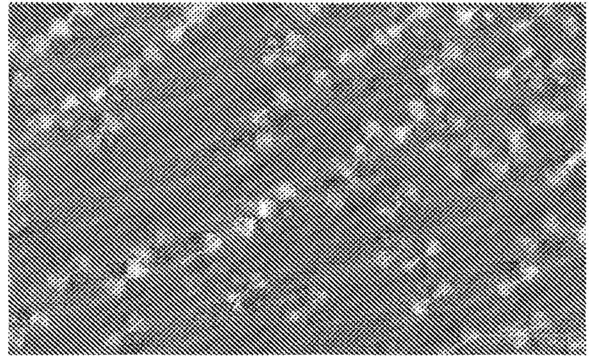
FIGS. 3A and 3B illustrate optical microscopy images of Example 4 with a ceramming cycle of 750° C.-2 hr having a zoom of 500 μm (FIG. 3A) and 100 μm (FIG. 3B), according to some embodiments. Images were taken on polished samples of 2.0 mm thick under a Leica microscope.
Figure 3B:
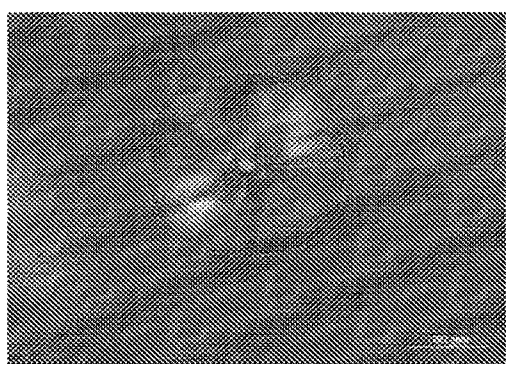
Figure 4:
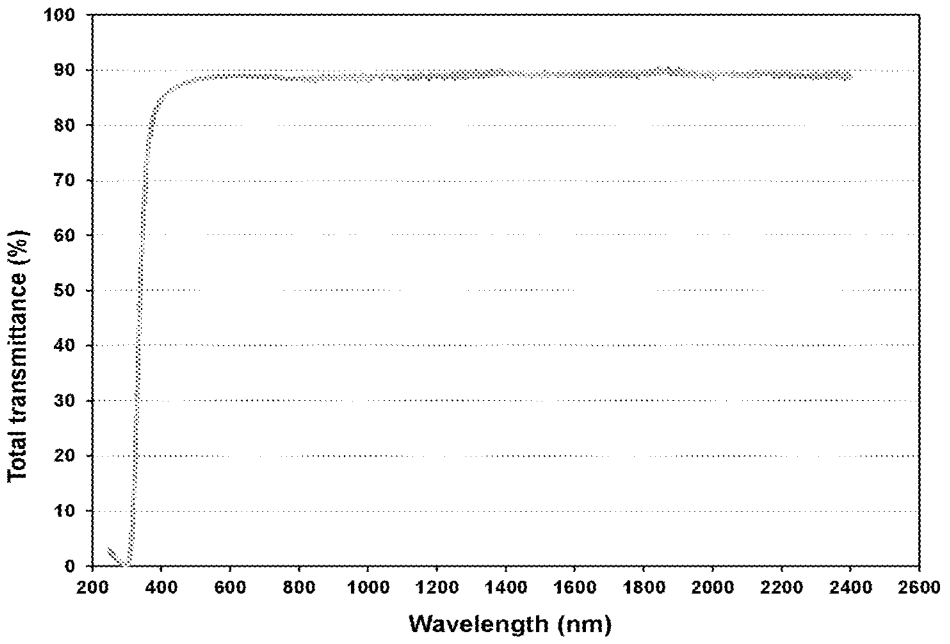
FIG. 4 illustrates a transmittance measurement of Example 4 with a ceramming cycle 650° C.-1 hr/750° C.-1 hr. A 1.0 mm thickness sample was used for measurement, according to some embodiments.

Despite large combeite crystal sizes (in the major phase) in the range of 100-300 μm (which is much larger than the wavelength of visible light (350-750 nm)), (as seen in FIGS. 3A and 3B, which illustrate optical microscopy images of Example 4 with a ceramming cycle of 750° C.-2 hr), transparent glass-ceramic articles with >50% transmittance in visible light range may be achieved in Example 4. This is an unexpected result because in comparison, finer crystallite sizes (<100 nm) are usually required to minimize light scattering and to achieve high transparency in glass-ceramics. For context, transmittance is a measurement of light passing through a thickness and transparency is defined as over 50% transmittance through a sample. FIG. 4 illustrates transmittance measurements of Example 4 with a ceramming cycle 650° C.-1 hr plus 750° C.-1 hr. A 1.0 mm thickness sample was used for measurement. The transmittance measurements were performed using a PerkinElmer 950 spectrometer with 150 mm integrated sphere from 200 to 2400 nm wavelength. Total transmittance approaches 90% for wavelengths exceeding about 400 nm. These high transmittance values may be due to a close matching of refractive index between the combeite phase and the residual glass, which leads to highly transparent glass-ceramics.

Glass-ceramic transparency can be further improved through ceramming cycle optimization. For instance, combination of a long nucleation cycle (675° C.-24 hr) first ceramming portion and a short growth hold (750-800° C. for 5 min) second ceramming portion can produce glass-ceramics with much finer grain size and improved transparency. FIG. 5 illustrates a phase assemblage plot of Example 12 cerammed using an optimized cycle of 675° C.-24 hr/775° C.-5 min and confirms the major crystallite phase is combeite. FIGS. 6A and 6B illustrate optical microscopy images of Example 12 cerammed using optimized cycles of 675° C.-24 hr/750° C.-5 min, 675° C.-24 hr/775° C.-5 min, and 675° C.-24 hr/800° C.-5 min. All three samples produced a high transparency through 2.0 mm thick samples. A relatively higher transparency is observed at the ceramming condition cycle of 675° C.-24 hr/775° C.-5 min. A corresponding microstructure using optical microscopy of this sample in FIG. 6B indicates formation of homogenous crystalline phase with a size of 30-50 μm.

Properties

Glass-ceramics prepared from the compositions of Table 1 (e.g., after undergoing ceramming described above) can have a higher fracture toughness and modulus than the same properties as measure for the glass composition itself. As an example, Table 3 provides mechanical properties of glass-ceramics produced by ceramming glass compositions of Example 4 from Table 1 and glass comprising the composition of Example 4.

TABLE 3

| Composition | Ceramming Cycle | Fracture Toughness (MPa · $m^{0.5}$) | Young's Modulus (GPa) | Shear Modulus (GPa) | Poisson's Ratio |
|---|---|---|---|---|---|
| Example 4 (glass) | N/A | 0.63 | 87.4 | 34.8 | 0.255 |
| Cerammed Example 4 (combeite glass-ceramic) | (i) 650° C.-1 hr (ii) 750° C.-1 hr | 1.09 | 103.2 | 41.2 | 0.251 |

Fracture toughness (as measured by the chevron notch short beam (CNSB) method) up to 1.1 MPa·$m^{0.5}$ can be achieved in the glass-ceramic produced from glass composition of Example 4, which is almost double as compared with 0.63 MPa·$m^{0.5}$, the fracture toughness of glass having the composition of Example 4. Moreover, a significantly higher modulus (103.2 GPa v. 87.4 GPa) is also observed in cerammed Example 4. The high fracture toughness and modulus make the materials attractive for a wide range of applications including biomaterials, structural materials, or cover glasses for consumer electronics.

Glass Manufacturing Processes

Glasses having the oxide contents listed in Table 1 can be made via traditional methods. For example, in some examples, the precursor glasses can be formed by thoroughly mixing the requisite batch materials (for example, using a turbular mixer) in order to secure a homogeneous melt, and subsequently placing into silica and/or platinum crucibles. The crucibles can be placed into a furnace and the glass batch melted and maintained at temperatures ranging from 1100° C. to 1400° C. for times ranging from about 6 hours to 24 hours. The melts can thereafter be poured into steel molds to yield glass slabs. Subsequently, those slabs can be transferred immediately to an annealer operating at about 400° C. to 700° C., where the glass is held at temperature for about 0.5 hour to 3 hours and subsequently cooled overnight. In another non-limiting example, precursor glasses are prepared by dry blending the appropriate oxides and mineral sources for a time sufficient to thoroughly mix the ingredients. The glasses are melted in platinum crucibles at temperatures ranging from about 1100° C. to 1400° C. and held at temperature for about 6 hours to 16 hours. The resulting glass melts are then poured onto a steel table to cool. The precursor glasses are then annealed at appropriate temperatures.

The embodied glass compositions can be ground into fine particles in the range of 1-10 microns (μm) by air jet milling or short fibers. The particle size can be varied in the range of 1-100 μm using attrition milling or ball milling of glass frits. Furthermore, these glasses can be processed into short fibers, beads, sheets or three-dimensional scaffolds using different methods. Short fibers are made by melt spinning or electric spinning; beads can be produced by flowing glass particles through a hot vertical furnace or a flame torch; sheets can be manufactured using thin rolling, float or fusion-draw processes; and scaffolds can be produced using rapid prototyping, polymer foam replication and particle sintering. Glasses of desired forms can be used to support cell growth, soft and hard tissue regeneration, stimulation of gene expression or angiogenesis.

Continuous fibers can be easily drawn from the claimed composition using processes known in the art. For example, fibers can be formed using a directly heated (electricity passing directly through) platinum bushing. Glass cullet is loaded into the bushing, heated up until the glass can melt. Temperatures are set to achieve a desired glass viscosity (usually <1000 poise) allowing a drip to form on the orifice in the bushing (Bushing size is selected to create a restriction that influences possible fiber diameter ranges). The drip is pulled by hand to begin forming a fiber. Once a fiber is established it is connected to a rotating pulling/collection drum to continue the pulling process at a consistent speed. Using the drum speed (or revolutions per minute RPM) and glass viscosity the fiber diameter can be manipulated—in general the faster the pull speed, the smaller the fiber diameter. Glass fibers with diameters in the range of 1-100 μm can be drawn continuously from a glass melt. Fibers can also be created using an updraw process. In this process, fibers are pulled from a glass melt surface sitting in a box furnace. By controlling the viscosity of the glass, a quartz rod is used to pull glass from the melt surface to form a fiber. The fiber can be continuously pulled upward to increase the fiber length. The velocity that the rod is pulled up determines the fiber thickness along with the viscosity of the glass.

This, as presented herein, glass-ceramic compositions are described with a major phase of combeite with improved optical and mechanical properties. Advantages include: high fracture toughness ranging from 0.9-2.5 $MPa \cdot m^{0.5}$ and Young's modulus ranging from 90-200 GPa, as well as high transparency exceeding 70% (for tested articles being 1.0 mm in thickness).

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

References herein to the positions of elements (e.g., "top," "bottom," "above," "below," "first," "second," etc.) are merely used to describe the orientation of various elements in the FIGURES. It should be noted that the orientation of various elements may differ according to other exemplary embodiments, and that such variations are intended to be encompassed by the present disclosure. Moreover, these relational terms are used solely to distinguish one entity or action from another entity or action, without necessarily requiring or implying any actual such relationship or order between such entities or actions.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

It will be understood by one having ordinary skill in the art that construction of the described disclosure, and other components, is not limited to any specific material. Other exemplary embodiments of the disclosure disclosed herein may be formed from a wide variety of materials, unless described otherwise herein.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

As utilized herein, "optional," "optionally," or the like are intended to mean that the subsequently described event or circumstance can or cannot occur, and that the description includes instances where the event or circumstance occurs and instances where it does not occur. As used herein, the indefinite articles "a," "an," and the corresponding definite article "the" mean "at least one" or "one or more," unless otherwise specified. It also is understood that the various features disclosed in the specification and the drawings can be used in any and all combinations.

With respect to the use of substantially any plural and/or singular terms herein, those having skill in the art can translate from the plural to the singular and/or from the singular to the plural as is appropriate to the context and/or application. The various singular/plural permutations may be expressly set forth herein for the sake of clarity.

Unless otherwise specified, all compositions are expressed in terms of as-batched mole percent (mol. %). As will be understood by those having ordinary skill in the art, various melt constituents (e.g., silicon, alkali- or alkaline-based, boron, etc.) may be subject to different levels of volatilization (e.g., as a function of vapor pressure, melt time and/or melt temperature) during melting of the constituents. As such, the as-batched mole percent values used in relation to such constituents are intended to encompass values within ±0.5 wt. % of these constituents in final, as-melted articles. With the forgoing in mind, substantial compositional equivalence between final articles and as-batched compositions is expected. For example, substantial compositional equivalence is expected between the as-batched glass compositions and the final, post-cerammed, glass-ceramic compositions.

It will be apparent to those skilled in the art that various modifications and variations can be made without departing from the spirit or scope of the claimed subject matter. Accordingly, the claimed subject matter is not to be restricted except in light of the attached claims and their equivalents.

What is claimed is:

1. A cerammed silicate-based composition, comprising, in mol. %:

35-65% $SiO_2$,
20-40% CaO,
10-30% $Na_2O$,
>0-15% $TiO_2$,
>0-15% $Al_2O_3$,
0-10% $P_2O5$,
0-15% $ZrO_2$, and
0-3% $SnO_2$, wherein the cerammed silicate-based composition has at least one of:

fracture toughness ranging from 0.9-2.5 $MPa \cdot m^{0.5}$, Young's modulus ranging from 90-200 GPa, or transparency exceeding 70%.

2. The composition of claim 1, wherein the composition comprises, in mol. %:
40-55% $SiO_2$,
25-40% CaO,
10-25% $Na_2O$, and
0.5-15% $Al_2O_3$.

3. The composition of claim 1, wherein the composition comprises, in mol. %: 0.5-10% Al2O3.

4. The composition of claim 1, wherein the composition comprises, in mol. %: >0-10% $TiO_2$.

5. The composition of claim 1, wherein the composition comprises, in mol. %: >0-10% $ZrO_2$.

6. The composition of claim 1, wherein the composition comprises, in mol. %: >0-5% $P_2O_5$.

7. The composition of claim 1, wherein the composition comprises, in mol. %: >0-3% $SnO_2$.

8. The composition of claim 1, wherein a totality of other oxides is, in mol. %, less than 1%.

9. The composition of claim 1, wherein the cerammed silicate-based composition comprises a major combeite crystallite phase.

10. The composition of claim 9, wherein the major combeite crystallite phase has a crystal size in a range of 100-300 μm.

11. The composition of claim 1, wherein the cerammed silicate-based composition comprises at least one minor phase including carnegieite, albite, nepheline, or combinations thereof.

12. A method of forming the cerammed silicate-based composition of claim 1, the method comprising:
ceramming a silicate-based composition comprising:
35-65% $SiO_2$,
20-40% CaO,
10-30% $Na_2O$,
>0-15% $TiO_2$,
>0-15% $Al_2O_3$,
0-10% $P_2O_5$,
0-15% $ZrO_2$, and
0-3% $SnO_2$
wherein the ceramming is a cycle comprising a first portion and a second portion, and
wherein the first portion is conducted at a first temperature for a first time and the second portion is conducted at a second temperature for a second time,
thereby forming the cerammed silicate-based composition.

13. The method of claim 12, wherein the first portion is conducted at a first temperature in a range of 500-1200° C. for a first time in a range of 12-36 hrs.

14. The method of claim 12, wherein the second portion is conducted at a second temperature in a range of 500-1200° C. for a second time in a range of 30 sec-1 hr.

15. The method of claim 12, wherein the cerammed silicate-based composition comprises a major combeite crystallite phase.

16. The method of claim 15, wherein the major combeite crystallite phase has a crystal size in a range of 100-300 μm.

17. The composition of claim 1, wherein the cerammed silicate-based composition comprises at least one minor phase including carnegieite, albite, or a combination thereof.

18. A cerammed silicate-based composition, comprising, in mol. %:
35-65% $SiO_2$,
20-40% CaO,
10-30% $Na_2O$,
>0-15% $TiO_2$,
>0-15% $Al_2O_3$,
0-10% $P_2O_5$,
0-15% $ZrO_2$, and
0-3% $SnO_2$,
wherein the cerammed silicate-based composition comprises a major combeite crystallite phase.

19. The composition of claim 18, wherein the composition comprises, in mol. %:
40-55% $SiO_2$,
25-40% CaO,
10-25% $Na_2O$, and
0.5-15% $Al_2O_3$.

20. The composition of claim 18, wherein the composition comprises, in mol. %, at least one of:
0.5-10% Al2O3,
>0-10% $TiO_2$,
>0-10% ZrO, and
>0-5% $P_2O_5$.

21. The composition of claim 18, wherein the major combeite crystallite phase has a crystal size in a range of 100-300 μm.

22. The composition of claim 18, wherein the cerammed silicate-based composition comprises at least one minor phase including carnegieite, albite, nepheline, or combinations thereof.

23. A cerammed silicate-based composition, comprising, in mol. %:
35-65% $SiO_2$,
20-40% CaO,
10-30% $Na_2O$,
>0-15% $TiO_2$,
>0-15% $Al_2O_3$,
0-10% $P_2O_5$,
0-15% $ZrO_2$, and
0-3% $SnO_2$,
wherein the cerammed silicate-based composition comprises at least one minor phase including carnegieite, albite, nepheline, or combinations thereof.

24. The composition of claim 23, wherein the composition comprises, in mol. %:
40-55% $SiO_2$,
25-40% CaO,
10-25% $Na_2O$, and
0.5-15% $Al_2O_3$.

25. The composition of claim 23, wherein the composition comprises, in mol. %, at least one of:
0.5-10% $Al_2O_3$,
>0-10% $TiO_2$,
>0-10% ZrO, and
>0-5% $P_2O_5$.

26. The composition of claim 23, wherein the cerammed silicate-based composition comprises at least one minor phase including carnegieite, albite, or combinations thereof.

* * * * *